(12) United States Patent
Cravedi

(10) Patent No.: US 8,585,232 B2
(45) Date of Patent: Nov. 19, 2013

(54) SOLAR LIGHT KIT WITH RECYCLED BOTTLE

(76) Inventor: James Cravedi, Auburndale, MA (US)

(*) Notice: Subject to any disclaimer, the term of this patent is extended or adjusted under 35 U.S.C. 154(b) by 243 days.

(21) Appl. No.: 13/304,224

(22) Filed: Nov. 23, 2011

(65) Prior Publication Data

US 2013/0128566 A1  May 23, 2013

(51) Int. Cl.
*F21L 4/00* (2006.01)

(52) U.S. Cl.
USPC ............ 362/183; 362/191; 362/431; 362/153

(58) Field of Classification Search
USPC ......... 362/183, 190, 191, 151, 152, 153, 431, 362/396, 217.17, 223
See application file for complete search history.

(56) References Cited

U.S. PATENT DOCUMENTS

| | | | | |
|---|---|---|---|---|
| 4,726,552 A | * | 2/1988 | Warshawsky | 248/122.1 |
| 5,062,028 A | * | 10/1991 | Frost et al. | 362/183 |
| 5,287,256 A | * | 2/1994 | Bennett et al. | 362/152 |
| 8,292,452 B2 | * | 10/2012 | Ko | 362/183 |
| 2007/0002561 A1 | * | 1/2007 | Tesmer et al. | 362/183 |

* cited by examiner

*Primary Examiner* — Bao Q Truong

(57) ABSTRACT

A light kit comprises a clamp having a cap fitable over a top portion of a top tube. The top tube further has a bottom portion. A tee has a top portion in which the bottom portion of the top tube is fitable. The tee further has a side portion, and a bottom portion. An elbow is attachable to the side portion of the elbow. The elbow has a top portion. A light tube is attachable to the top portion of the elbow. The light tube is capable of fitting within a container, wherein the clamp is fitable to secure a container between the clamp and the top portion of the elbow.

10 Claims, 3 Drawing Sheets

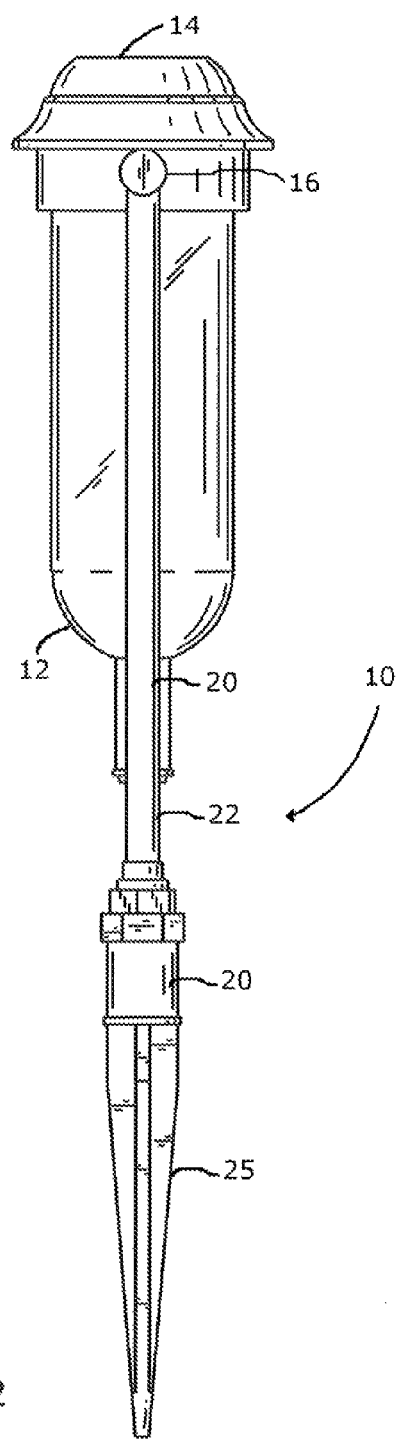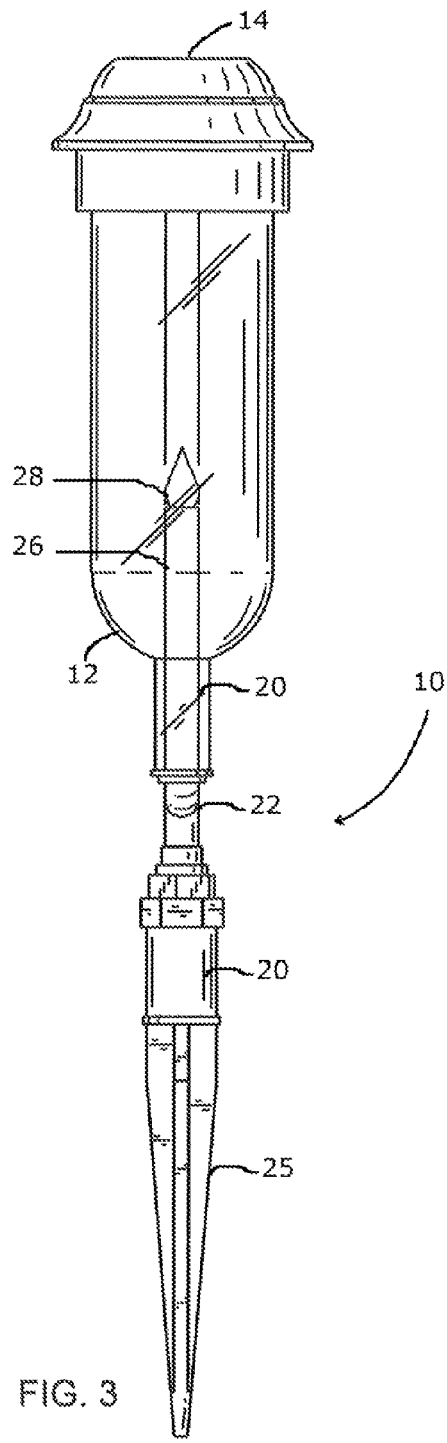

SOLAR LIGHT KIT WITH RECYCLED BOTTLE

BACKGROUND OF THE INVENTION

The present invention generally relates to a solar light kit with a recycled bottle. More specifically, the invention relates to a solar light kit that recycles a glass wine bottle or the like.

After people consume wine or other drinks, the generally discard the bottle to either trash or landfill causing increased pollution.

Thus, there is a need for system and method that provides an alternative to merely discarding bottles after use.

SUMMARY OF THE INVENTION

In one aspect of the present invention, a light kit, comprises a clamp having a cap fitable over a top portion of a top tube, the top tube further having a bottom portion; a tee having a top portion in which the bottom portion of the top tube is fitable, the tee further having side portion, and a bottom portion; an elbow attachable to the side portion of the elbow, the elbow having a top portion; and a light tube attachable to the top portion of the elbow, the light tube capable of fitting within a container, wherein the clamp is fitable to secure a container between the clamp and the top portion of the elbow.

In another aspect, a light kit comprises a clamp having a solar cap fitable over a top portion of a top tube, the top tube further having a bottom portion, the solar cap comprising a solar cell capable of receiving light for conversion to storable electric current; a tee having a top portion in which the bottom portion of the top tube is fitable, the tee further having side portion, and a bottom portion; an elbow attachable to the side portion of the elbow, the elbow having a top portion; a light tube attachable to the top portion of the elbow, the light tube capable of fitting within a container, wherein the clamp is fitable to secure a container between the clamp and the top portion of the elbow.

These and other features, aspects and advantages of the present invention will become better understood with reference to the following drawings, description and claims;

BRIEF DESCRIPTION OF THE DRAWINGS

FIG. 2 is a rear elevational view of the solar light kit of FIG. 1;

FIG. 3 is a front elevational view of the solar light kit of FIG. 1;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
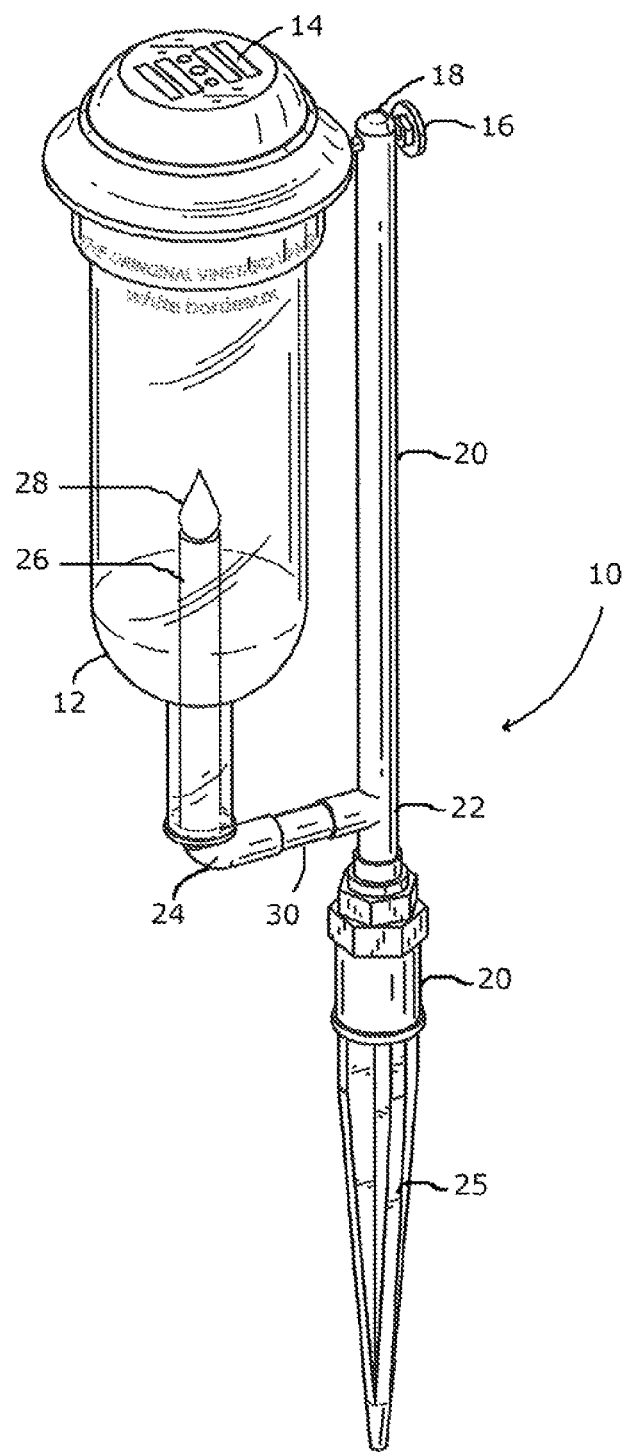
FIG. 1 is a perspective view of a solar light kit with a recycled bottle according to one embodiment.

Broadly, embodiments of the present invention generally provide a solar light kit that recycles a glass, wine bottle or other type of container. With reference to FIGS. 1, 2 and 3, FIG. 1 is a perspective view of a solar light kit 10 with a recycled bottle 12 according to one embodiment, FIG. 2 is a rear elevational view of the solar light kit of FIG. 1, and FIG. 3 is a front elevational view of the solar light kit of FIG. 1. The device may comprise a solar top 14 or clamp, which may comprise one or more solar cells for converting light energy into storable energy.

The solar top 14 may attach to an upper tube or pipe 20 by means of a cap 18 that may receive a screw 16 that may fit into a threaded portion of the cap 18. The bottle 12 may fit upside-down so as to receive a light tube 26 through the top of the bottle 12, with the top of the bottle lying on the inner part of an elbow 24. The Light tube may have a threaded socket to receive a light bulb 28 therein.

A threaded stub 30 may screw between the elbow and a tee 22. The upper tube 20 on which the cap may be screwed may fit or screw into a top portion of the tee 22, while a bottom tube 20 may fit into the bottom of the tee 22 to thereby support the full kit 10 thereupon.

All of the tubing 20, and light tube 26, may comprise various materials, such as copper, polyvinyl chloride (PVC), or the like. For example, copper material may allow for a longer lasting, more robust kit, while PVC may be used and powder coated to save on expense in some embodiments.

Figure 4:
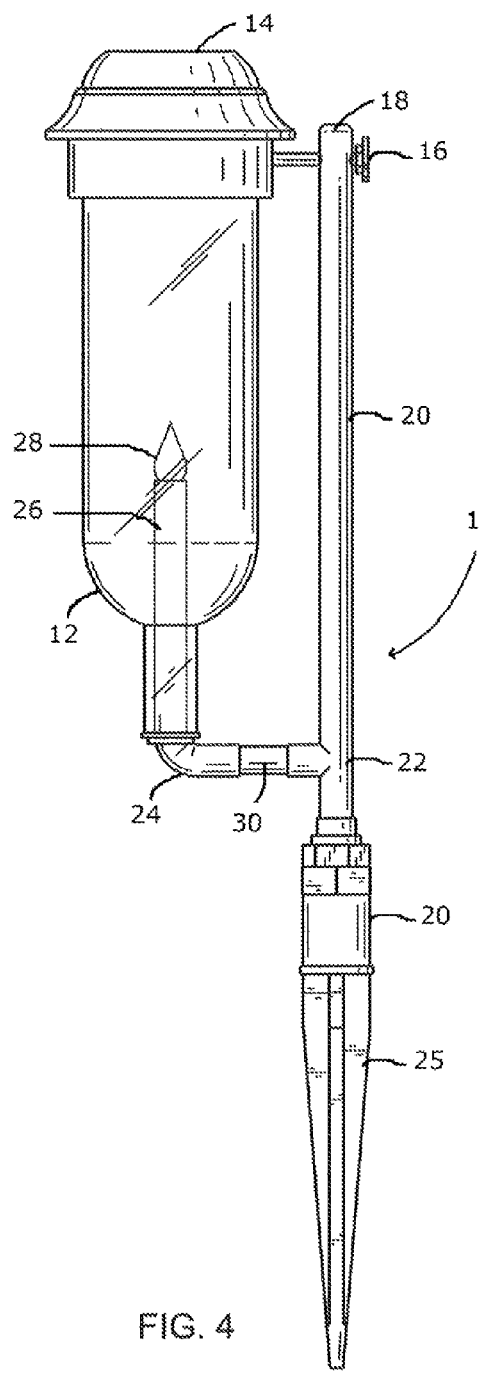
FIG. 4 is a side elevational view of the solar light kit of the embodiment of FIG. 1.
Figure 5:
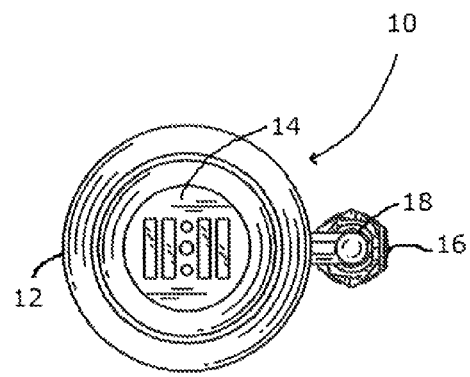
FIG. 5 is a top elevational view of the solar light kit of the embodiment of FIG. 1.
Figure 6:
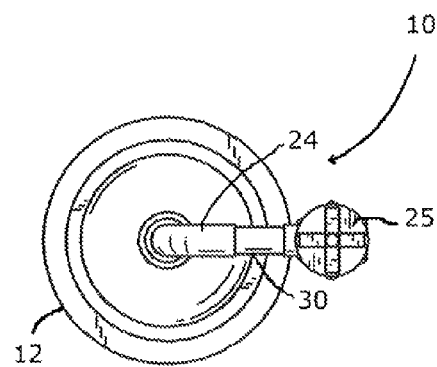
FIG. 6 is a bottom elevational view of the solar light kit of the embodiment of FIG. 1.

With reference to FIGS. 4, 5 and 6, FIG. 4 is a side elevational view of the solar light kit 10 of the embodiment of FIG. 1, FIG. 5 is a top elevational view of the solar light kit of the embodiment of FIG. 1, and FIG. 6 is a bottom elevational view of the solar light kit of the embodiment of FIG. 1. The bottom tube 20 may have a bottom that fits into a coupling 25, which can further function as a spike inserted into soil. The bottom of the coupling 20 may thus Universally be fit into a ground spike, mounting on a wall, or any threaded or fitted tube on which the kit 10 may be placed.

In one embodiment, the screw 16 may fit all the way through the cap, 18, top tube 20, and top 14 to secure the top onto the upper tube, which may, in turn secure the bottom onto the top of the elbow 24.

It should be understood, of course, that the foregoing relates to exemplary embodiments of the invention and that modifications may be made without departing from the spirit and scope of the invention as set forth in the following claims.

The invention claimed is:

1. A light kit, comprising:
    a clamp having a cap fitable over a top portion of a top tube, the top tube further having a bottom portion;
    a tee having a top portion in which the bottom portion of the top tube is fitable, the tee further having side portion, and a bottom portion;
    an elbow attachable to the side portion of the elbow, the elbow having a top portion; and
    a light tube attachable to the top portion of the elbow, the light tube capable of fitting within a container, wherein the clamp is fitable to secure a container between the clamp and the top portion of the elbow.

2. The light kit of claim 1, further comprising a screw capable of securing the top tube to the cap.

3. The light kit of claim 1, further comprising a stub fitting in between the elbow and the side portion of the tee.

4. The light kit of claim 1, further comprising a light socket fitted within the light tube capable of receiving a light bulb.

5. The light kit of claim 1, wherein the container is a glass.

6. The light kit of claim 1, wherein the container is a bottle.

7. A light kit, comprising:

a clamp having a solar cap fitable over a top portion of a top tube, the top tube further having a bottom portion, the solar cap comprising a solar cell capable of receiving light for conversion to storable electric current;

a tee having a top portion in which the bottom portion of the top tube is fitable, the tee further having side portion, and a bottom portion;

an elbow attachable to the side portion of the elbow, the elbow having a top portion;

a light tube attachable to the top portion of the elbow, the light tube capable of fitting within a container, wherein the clamp is fitable to secure a container between the clamp and the top portion of the elbow.

8. The light kit of claim 7, further comprising a light socket fitted within the light tube capable of receiving a light bulb.

9. The light kit of claim 7, wherein the container is a glass.

10. The light kit of claim 7, wherein the container is a bottle.

\* \* \* \* \*